Aug. 9, 1927.

C. C. CALDWELL 1,638,470

WARDROBE TRUNK

Filed Nov. 5, 1925

WITNESS:

INVENTOR

Charles C. Caldwell

BY

ATTORNEYS.

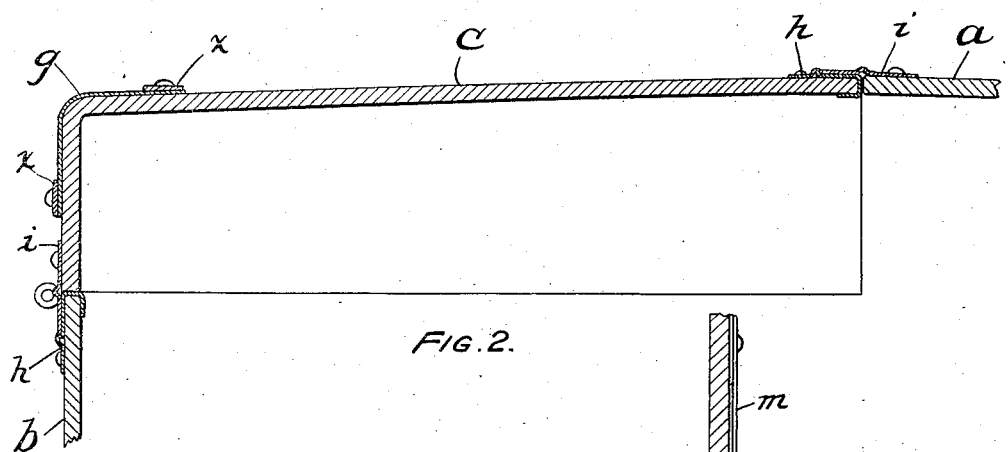
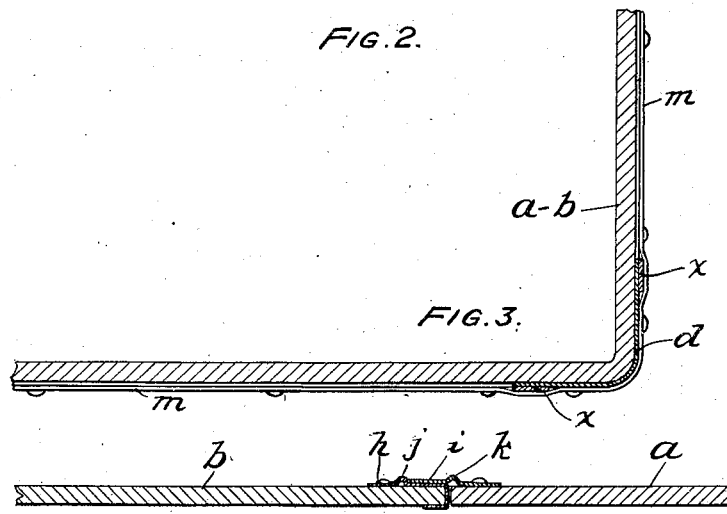
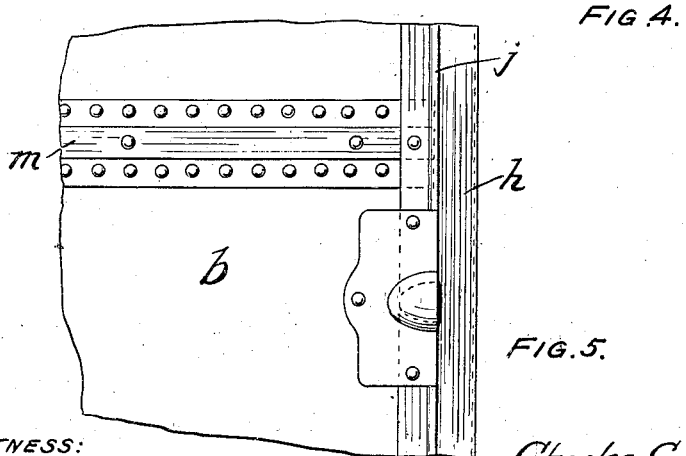

Patented Aug. 9, 1927.

1,638,470

UNITED STATES PATENT OFFICE.

CHARLES C. CALDWELL, OF WOODBURY, NEW JERSEY, ASSIGNOR TO THE BELBER TRUNK & BAG COMPANY, OF PHILADELPHIA, PENNSYLVANIA, A CORPORATION OF PENNSYLVANIA.

WARDROBE TRUNK.

Application filed November 5, 1925. Serial No. 66,885.

The object of my invention is to provide a trunk body having maximum strength and durability.

A preferred embodiment of this invention is shown in the drawings in which—

Fig. 2 is a vertical section through the hinged lid and an adjacent part of the compartment body to which it is hinged and an adjacent part of the other compartment body.

Fig. 3 is a horizontal section through a part of the trunk between its upper and lower ends.

Fig. 4 is a horizontal section through parts of the fronts of the two compartment bodies.

Fig. 5 is a partial front view of the trunk.

Figure 1:
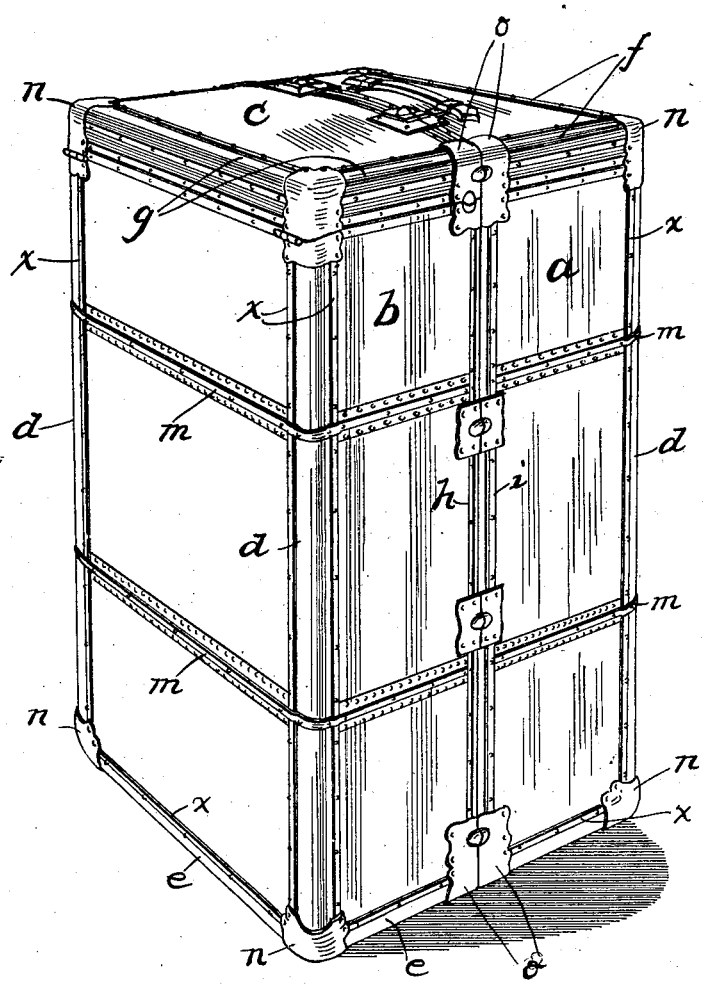
Fig. 1 is a perspective view, looking toward the front and one side, of a complete wardrobe trunk embodying my invention.

The trunk, which in Fig. 1 is shown in an upright position, which it occupies when in use, comprises, as usual, two sections or compartment bodies $a$ and $b$, hinged together, on a vertical axis, at the rear and adapted to engage and interlock at the front. Compartment body $b$ is provided with a lid, cover or top $c$ hinged to the body at one side of the trunk. Vertically extending angular protective strips $d$ overlap adjacent faces of the front and sides and adjacent faces of the rear and side. Similar protective strips $e$, extending horizontally, overlap adjacent faces of the bottom and front, bottom and rear, and bottom and sides. Similar strips $f$, extending horizontally, overlap the top and front, top and rear and top and side of section $a$. Similar strips $g$, extending horizontally, overlap the top and front, top and rear and top and side of the hinged cover $c$.

Narrow reinforcing strips $x$, preferably of metal, overlie the protective strips, along the edges thereof, the edges of the reinforcing strips and protective strips being preferably flush. The protective strips and reinforcing strips are riveted to the trunk body.

Reinforcing strips are also secured along the four edges of each trunk section, edges of opposing sections being adapted to interlock when the two sections are swung together to close the trunk. See Fig. 4. Each edge-reinforcing strip $h$ of one section (say $b$) is of angular contour, the main part of the strip extending along the front or outside of the section to the edge thereof and flanged portions thereof extending along the edge of the section and thence along the rear or inside of the section adjacent the edge. The strip is riveted to the section near the edge of the outside part of the strip remote from the edge of the section. A bead $j$ extends along the outside of the strip parallel to its edges. Each edge-reinforcing strip $i$, applied to the outside of section $a$ and projecting beyond the edge of section $a$, is provided with a bead $k$ extending parallel to and between its opposing edges. When the two sections are swung together, the projecting part of strip $i$ slides along the outside of strip $h$ and abuts against the bead $j$ when the opposing edges of the sections are brought together. The described construction is both dustproof and waterproof. A similar construction is applied to the top of section $a$ and the free end of the cover $c$ of section $b$, as shown in Fig. 2. Similar constructions are also applied to the hinged-together members of the trunk body and to the front and rear flanges of cover $c$ and the upper edges of the front and rear of section $b$.

Extending circumferentially around the trunk body are reinforcements $m$. Each circumferential reinforcement comprises a semi-circumferential strip extending between the front and rear edges of one section and a semi-circumferential strip extending between the front and rear edges of the other section. Each strip $m$ extends under the vertically extending reinforcing edge strips $h$ or $i$ and over the vertically extending reinforcing strips $x$ and the vertically extending protective strips $d$, as shown in Fig. 3.

At the eight corners of the trunk (and by a corner I mean the junction of any three faces of the trunk) are applied relatively heavy metallic corner pieces $n$ under which extend both the ends of the angular protective strips $d$, $e$, $f$ and $g$ and the ends of the corresponding narrow reinforcing strips $x$; and the corner pieces, protective strips and reinforcing strips are all riveted to the trunk body, thereby confining the protective strips and the reinforcing strips between the corner pieces and the trunk body. Similar corner pieces $o$ are applied to the four inside corners of such trunk section.

The resultant structure is very strong and durable. The reinforcing strips $x$ make for simplification, inasmuch as they dispense with the necessity of using a multitude of rivets to secure the protective strip to the trunk body.

Having now fully described my invention, what I claim and desire to protect by Letters Patent is:

A trunk body having angularly disposed walls, an angular protective strip at the meeting edges of such walls, and a narrow metal reinforcing strip extending over and along each edge of the protective strip.

In testimony of which invention, I have hereunto set my hand, at Philadelphia, Penna., on this 2nd day of November, 1925.

CHAS. C. CALDWELL.